J. F. KELLER, W. A. WARMAN & H. L. PARR.
FLUID MEASURING DEVICE.
APPLICATION FILED DEC. 19, 1913.
1,143,631.
Patented June 22, 1915.
2 SHEETS—SHEET 1.
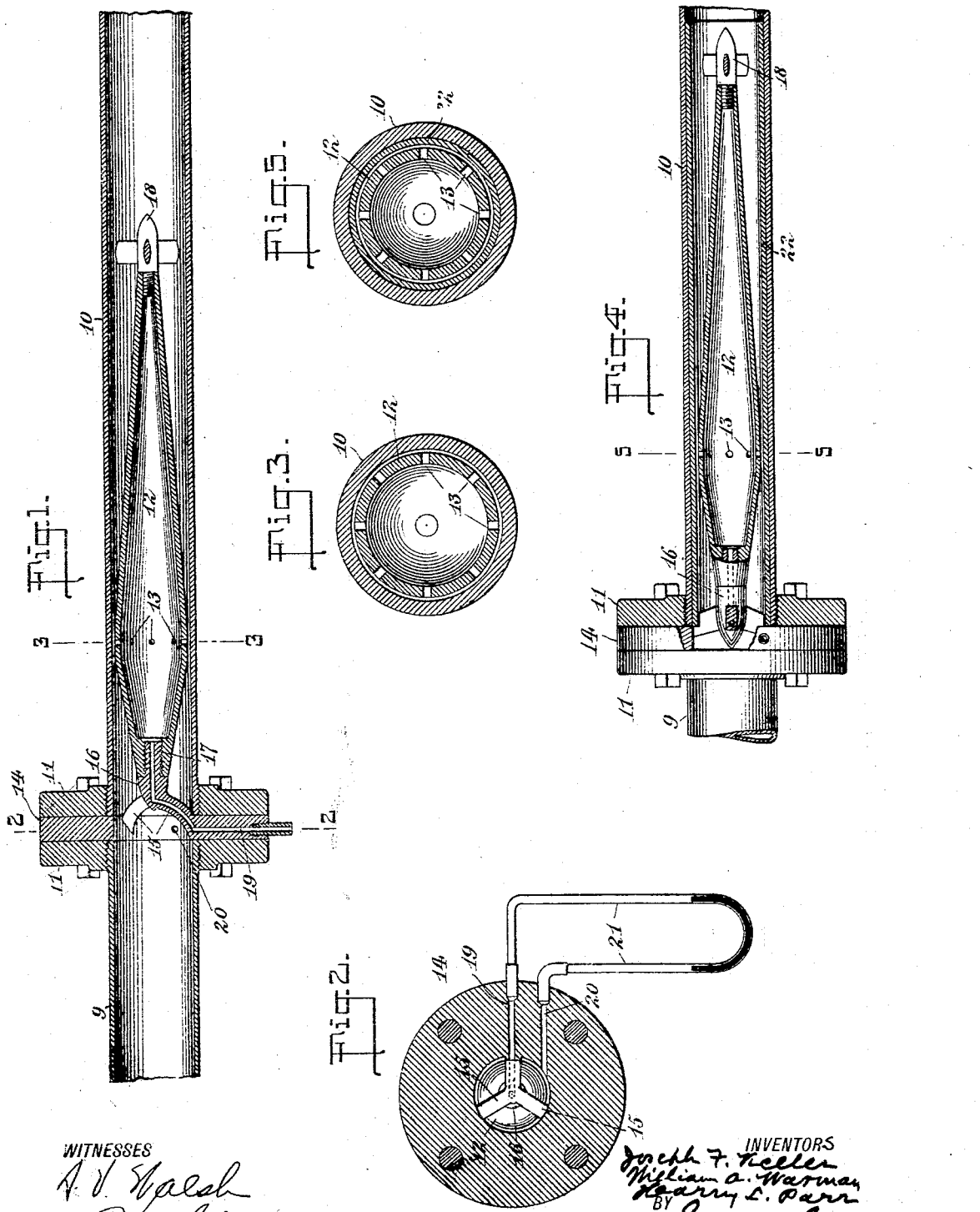

J. F. KELLER, W. A. WARMAN & H. L. PARR.
FLUID MEASURING DEVICE.
APPLICATION FILED DEC. 19, 1913.
1,143,631.
Patented June 22, 1915.
2 SHEETS—SHEET 2.
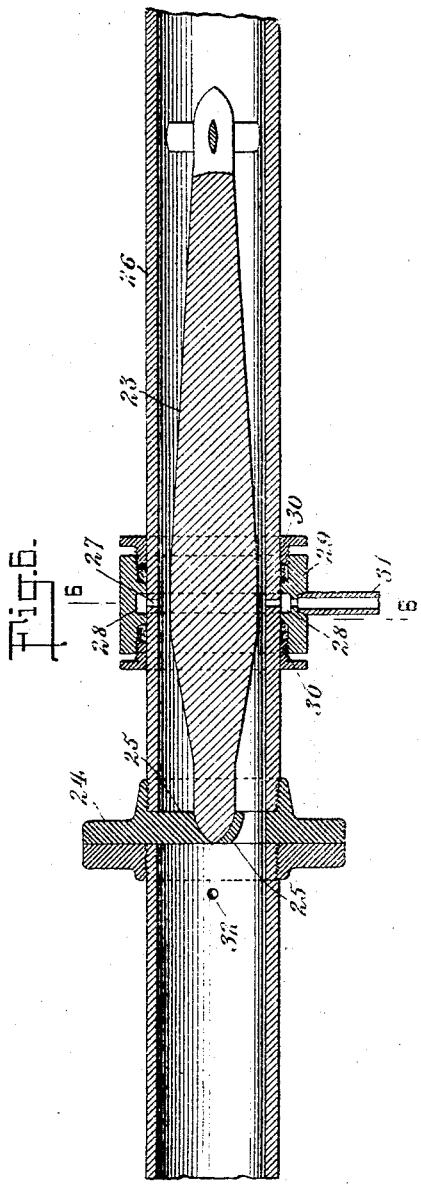
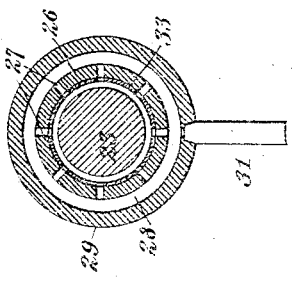
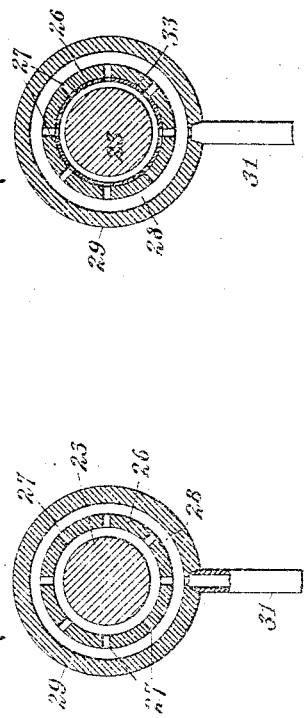
WITNESSES
INVENTOR
ATTORNEYS

UNITED STATES PATENT OFFICE.

JOSEPH F. KELLER AND WILLIAM A. WARMAN, OF NEW YORK, AND HARRY L. PARR, OF YONKERS, NEW YORK, ASSIGNORS TO KELLER MECHANICAL ENGRAVING COMPANY, OF BROOKLYN, NEW YORK, A CORPORATION OF NEW YORK.

FLUID-MEASURING DEVICE.

1,143,631.  Specification of Letters Patent.  Patented June 22, 1915.

Application filed December 19, 1913. Serial No. 807,598.

*To all whom it may concern:*

Be it known that we, JOSEPH F. KELLER, a citizen of the United States, and a resident of New York, borough of Manhattan, county and State of New York, WILLIAM A. WARMAN, a citizen of the United States, and a resident of New York, borough of Manhattan, county and State of New York, and HARRY L. PARR, a citizen of the United States, and a resident of Yonkers, county of Westchester, and State of New York, have jointly made and invented certain new and useful Improvements in Fluid-Measuring Devices, of which the following is a specification.

Our invention relates to apparatus for measuring the flow of fluid through a conduit; and the object thereof is to provide a measuring device which may be readily introduced into a line of piping without cutting, changing or otherwise interfering with the piping system, and which device will be simple in construction and effective for the purpose for which it is intended.

The preferred embodiment of our invention is illustrated in the drawings accompanying and forming a part of this application, although it will be understood that our invention may be embodied in other specific forms; and that the same includes such variations and modifications of the particular device illustrated and hereinafter described and claimed as will be obvious to those skilled in the art to which our invention relates.

In the drawing: Figure 1 is a view showing a section upon a longitudinal central plane of a portion of a line of piping within which our improved fluid measuring device is placed; Fig. 2 is a view showing a section upon a transverse plane indicated by the line 2—2, Fig. 1; Fig. 3 is a view somewhat enlarged and showing a section upon a transverse plane indicated by the line 3—3, Fig. 1; Fig. 4 is a view similar to Fig. 1 but showing a slightly modified form of our improved fluid measuring device; Fig. 5 is a view somewhat enlarged and showing a section upon a transverse plane indicated by the line 5—5, Fig. 4; Fig. 6 is a view similar to Fig. 1 but showing a form of our device in which a solid deflecting member is employed; Fig. 7 is a view showing a section upon a transverse plane indicated by the line 6—6, Fig. 6; and Fig. 8 is a view similar to Fig. 7 but illustrating the use of an auxiliary tube or liner in the line of piping.

Referring first to Figs. 1 to 3 of the drawings, the reference numerals 9 and 10 designate portions of two sections of a line of piping through which steam, air or other fluid may flow, the ends of said sections being provided with flanges 11 whereby the sections may be secured together to form a continuous system of piping, as will be understood.

Located within the section 10 is an elongated hollow member 12 referred to herein as a deflector because of the fact that the fluid as it flows past said member is deflected toward the wall of the pipe section and made to flow through a restricted passage annular in form in the preferred embodiment of our invention illustrated, said deflector being preferably in the general form of two hollow cones having a common base in order to reduce the resistance encountered by the fluid as it flows through the line of piping. The deflecting member is provided with a series of openings 13 past which the fluid flows and which openings lead into the interior thereof, these openings being located in practice at the place where the area of the passage between the deflector and the surrounding wall of the pipe section in which it is placed is reduced to a minimum.

The deflecting member or deflector is shown as supported within the pipe section 10 by means of a disk-shaped supporting member 14, the central portion of which is provided with arms 15 whereby intervening openings through which the fluid may flow are provided. The inner ends of said arms merge with a centrally located projection 16 extending axially of the pipe section 10, with which projection the deflector 12 is connected as by means of a threaded connection at 17, as illustrated. The arms 15 are offset or inclined as shown in Fig. 1 in order that the area of the fluid passage at the center of the supporting member 14, at which point the pressure or head of the fluid is measured as will hereinafter appear, may not be obstructed or reduced to any considerable extent by the arms. The remote end of the deflector is commonly supported in a central position within the pipe section 10 as by means of a spider 18.

A suitable conduit leads from the exterior of the line of piping into the interior of the deflecting member, such conduit being shown as provided by a passage 19 extending inward from the periphery of the supporting member 14 through one of the arms 15 thereof and along the central projection 16 into the deflecting member, whereby the interior of said member is placed in communication with the exterior of the line of piping. A second passage 20 is shown as extending through the supporting member 14 and the inner end of which passage communicates with the interior of the line of piping, as shown in Fig. 2. It therefore follows that because of the offset arrangement of the arms 15 the cross-section of the line of piping is not obstructed by the arms, and that the pressure at the inner end of the passage 20 is the pressure of an unobstructed cross-section of the line of piping. The outer ends of the passages 19 and 20 are connected with any suitable device whereby the difference in pressure in said passages may be measured, such, for example, as a U-shaped tube 21, Fig. 2, the lower portion of which contains a mass of mercury.

In a line of piping the several flanges like the flanges 11 will normally be in contact with one another and secured together by suitable bolts. If, however, the bolts are removed, the free ends of the pipe sections and their flanges may be readily moved sidewise to an extent sufficient to permit the deflector to be placed in one of the pipe sections, and the flanges separated a sufficient distance to receive the supporting member 14 between them, whereupon and after the parts have been properly readjusted and the bolts replaced the supporting member will be held between the flanges at the ends of two pipe sections and the deflector will be supported from said member, as illustrated in the drawing.

When a fluid is flowing from left to right through the piping shown, the pressure of the fluid or head within the line of piping may be measured by any suitable instrument connected with the passage 20, while the pressure within the deflecting member 12 may be measured by any suitable instrument connected with the passage 19. The pressure within the deflecting member will be equal to the pressure at the reduced annular passage with which the openings 13 communicate, and will be lower than the pressure in the line of piping as measured at the inner end of the passage 20. This difference in pressure is a function of the energy expended in accelerating the rate of flow from the velocity existing within the line of piping to the velocity necessary to cause the fluid to pass through the reduced section surrounding the deflecting member 12, and from this difference in pressure the rate of flow through the reduced section and past the openings 13 may be calculated by well known formulæ of either hydraulics or thermodynamics depending upon the character of the fluid, the flow of which is to be measured, all as will be understood. In the arrangement illustrated this difference in pressure is measured by the U-shaped tube 21 above referred to, and is a function of the difference in level of the mercury in the two sides of the tube when the device is in use.

The velocity of flow of the fluid through the line of piping may be computed from the difference in pressure between the pressure within the line of piping and the pressure at the reduced section surrounding the deflecting member, together with a knowledge of the respective areas of the piping and reduced section and the physical characteristics of the fluid flowing in the piping. The velocity thus computed must be multiplied by a constant determined experimentally in order to compensate for losses due to friction; and from the velocity of flow thus determining the volume or weight of the fluid flowing through the piping in a given time may be calculated. In practice, however, a deflecting member designed for use within a pipe of a given commercial size will be placed in a pipe of that size and calibrated by means of a standard meter; and a table or curve will be made in which various readings of the pressure measuring device used, and corresponding rates of flow as determined by the standard meter, are tabulated; after which and when the deflecting member is placed in a line of piping of the same diameter as that in which it was calibrated, readings of differences in pressure will, by comparison with the table above referred to, indicate the volume of fluid flowing through the piping in question. It will be understood, however, that if greater accuracy is required, the device may be calibrated in the position in which it is to be used; that is, after a given deflecting member has been placed within the particular line of piping in which it is to be used.

In cases where the deflecting member is calibrated in one section of pipe and used in another, even though the two are as near as may be of the same diameter, certain slight errors may occur when using the calibration table or curve, due to slight variations in the diameter, surface conditions, etc., of the two pipe sections. These errors, however, are comparatively small, and, moreover, may be eliminated entirely by the construction illustrated in Figs. 4 and 5.

In the form of our invention illustrated in Figs. 4 and 5 the same deflecting member and supporting means for holding the same within a line of piping is employed as those hereinbefore referred to and described. In this form of our invention, however, a separate tube or pipe section 22 is employed, which section surrounds the deflecting member and is secured in place within the section 10 in any way. This tube will be carefully made and finished and, after a given deflecting member and the tube which is to be used with it have been calibrated together by comparison with a standard meter, and a table or curve showing rates of flow corresponding with various differences of pressure has been tabulated or drawn, the tube and deflector may be placed in any given line of piping the interior diameter of which is approximately the same as the external diameter of the tube without in the least impairing the accuracy of the device or necessitating corrections in the calibration curve or table.

Although in the forms of our device illustrated in Figs. 1 to 5 the deflecting member is made hollow and the pressure at the reduced area of the fluid conduit is measured from within the deflector, the pressure at the reduced section may be measured from without the pipe and the deflector made solid or with no passage like the passage 19 leading into its interior. Thus, in the form of our device illustrated in Figs. 6 to 8 the deflecting member 23 is made solid and is supported from a combined flange and supporting member 24 having arms 25 with which the deflector is connected. The pipe section 26 in such a case is provided with a series of holes 27 located at the point of least cross-section of the fluid conduit, which holes communicate with an annular recess 28 formed in a collar or sleeve 29, surrounding the pipe section 26 and made tight by suitable stuffing boxes or glands at 30 as shown. A pipe 31 communicates with the passage 28 whereby the pressure at the area of least cross-section of the fluid conduit may be measured, while the pressure at the unobstructed area of the conduit is measured by another pipe the inner end of which is shown at 32. A separate inner tube or liner like the tube 22 and for the same purpose is shown at 33, Fig. 8, said tube having holes registering with the holes 27 in the pipe section 26 as illustrated.

Having thus described and explained our invention, we claim and desire to secure by Letters Patent:

1. In a fluid meter, a disk-shaped supporting member having openings adapted to register with the interior of a conduit through which fluid may flow; an elongated hollow deflector closed at its ends and having an opening in its side wall leading into its interior and past which opening a fluid may flow; means whereby said deflector is supported from said supporting member; and a conduit leading into the interior of said deflector.

2. In a fluid meter, a disk-shaped supporting member having openings at its central portion whereby a series of arms are provided; and an elongated hollow deflector closed at its ends and supported by said arms and having an opening in its side wall leading into its interior and past which opening a fluid may flow; said support and one of said arms having a passage leading into the interior of said deflector.

3. In a fluid meter, a disk-shaped supporting member having openings adapted to register with the interior of a conduit through which fluid may flow; an elongated hollow deflector closed at its ends and having an opening in its side wall leading into its interior and past which opening a fluid may flow; and a tube surrounding said deflector; means whereby said deflector is supported from said supporting member; and a conduit leading into the interior of said deflector.

4. In a fluid meter, a disk-shaped supporting member having openings at its central portion whereby a series of arms are provided; an elongated hollow deflector closed at its ends and supported by said arms and having an opening in its side wall leading into its interior and past which opening a fluid may flow; and a tube surrounding said deflector; said support and one of said arms having a passage leading into the interior of said deflector.

Signed at New York city, in the county of New York, and State of New York, this 12" day of December, 1913.

JOSEPH F. KELLER.
WILLIAM A. WARMAN

Witnesses:
ANNA V. WALSH,
GEORGE E. COOK.

HARRY L. PARR.

Witnesses:
B. W. ROGOWSKI,
M. BARTON EDDISON.